United States Patent [19]

Sakurada

[11] Patent Number: 5,350,511
[45] Date of Patent: Sep. 27, 1994

[54] SEWAGE PURIFICATION APPARATUS

[76] Inventor: Yasuyuki Sakurada, 6-3, Shitte 3-chome, Tsurui-ku, Yokohama-shi, Kanagawa-ken, Japan

[21] Appl. No.: 916,079

[22] PCT Filed: Jan. 29, 1991

[86] PCT No.: PCT/JP91/00103
§ 371 Date: Jul. 29, 1992
§ 102(e) Date: Jul. 29, 1992

[87] PCT Pub. No.: WO91/11243
PCT Pub. Date: Aug. 8, 1991

[30] Foreign Application Priority Data

Jan. 29, 1990 [JP] Japan ................... 2-18140

[51] Int. Cl.⁵ .............................. B01D 21/24
[52] U.S. Cl. ...................... 210/199; 210/205
[58] Field of Search ............. 210/199, 205–208, 210/319

[56] References Cited

U.S. PATENT DOCUMENTS 4,134,833  1/1979  McCormick ............ 210/121
4,710,290 12/1987  Britz ..................... 210/205

FOREIGN PATENT DOCUMENTS

0389405  9/1990  European Pat. Off. .
0179674  4/1986  France .
8900150  1/1989  PCT Int'l Appl. .

Primary Examiner—Ivars Cintins
Attorney, Agent, or Firm—Wenderoth, Lind & Ponack

[57] ABSTRACT

A continuous purification apparatus includes a mixer to mix contaminated water and purifying chemicals, a purifying tank to receive mixed matter from the mixer and in which inorganic and organic matter are separated to produce floating matter, sediment and purified liquid, a purified liquid piping system by which the supernatant in the tank is discharged, and a drain piping system by which the floating matter and sediment are discharged. An intermittent type purification apparatus includes a window mechanism provided in a side wall of the tank and a tub encompassing a lower peripheral portion of the tank.

8 Claims, 13 Drawing Sheets

SEWAGE PURIFICATION APPARATUS

BACKGROUND OF THE INVENTION

1. Field of the Invention

This invention relates to an apparatus that highly purifies contaminated rivers, lakes, swamps, bay seawater, domestic sewage, industrial waste fluid, butcher waste fluid, sewage, dust waste fluid, garbage incinerator waste fluid, dung, agricultural chemicals, germicides, kitchen sewage and the like. 2. Description of the Related Art Conventional sewage purification apparatuses use a concrete reservoir occupying a spacious amount of land or building, wherein an apparatus to culture aerobic bacteria is equipped in the reservoir to continuously supplement water in the reservoir with bacteria. Simultaneously, air is pumped through the water for activation. Contaminated water diluted by several-fold water is attacked by bacteria so that contaminants in the water are digested by the bacteria and purified. However, this process takes several months, requires large equipment and accrues high costs. It also needs an enormous amount of land and a large apparatus for achieving complete purification. Because of this, contaminated water has undesirably been drained into rivers after having been diluted by several-fold water, resulting in polluted rivers, lakes, swamps and seas. A filtering apparatus using sands, activated carbon, membranes or the like, is very expensive and very uneconomical.

In the past, various kinds of single flocculants have been used to purify water by cohering and removing sludge and inorganic matters from contaminated water. Aluminum sulfate, ferric chloride, polymer flocculants and the like have been used alone as the flocculant. When contaminated water was mixed and stirred with a single flocculant and left to settle, only small stones and sands cohered and settled on the bottom of the container after 6 to 24 hours, and the water did not become transparent. In civil engineering structures, the process was repeated until the contaminated water became transparent. However, it was impossible to remove impurities dissolved in the water even when the apparatus accounted for 30% of the construction costs.

Contaminated water generated at construction sites was sent by a pump into a large tank installed on the highest mountain or hill nearby, wherein the water was stirred with a single flocculant and left for 6 to 24 hours to separate inorganic matter by cohesion-sedimentation. Then supernatant, although still translucent, was transferred to another purification tank installed at a lower level, wherein the flock was stirred again and left for 6 to 24 hours; thereafter the supernatant was transferred to another tank installed on the hill at a lower level. This process was repeated several times.

Specifically, the process was repeated more than 6 to 10 times, and transparent water was finally drained into the river. Even now, ferric chloride, alum or the like is used at construction sites. (However, BOD and COD of the contaminated water or purified water are not taken into account.) Therefore, even if the water became transparent, it was still contaminated.

It is understood in academia and in industry that contaminants in water are unable to be purified by separation and removal using any kinds of flocculants. Therefore, in water treatment plants and sewage purification plants, solid materials and inorganic matter in the sewage are first removed by slow sedimentation, filtering, or by a slow sedimentation-separation using a single flocculant (ferric chloride) mixed and stirred. Then after a slow sedimentation-separation, it is attacked with bacteria for 1 to 5 days by means of the activated-sludge process, whereby invisibly small bacteria are cultivated with air to digest the contaminants. This process requires an enormous amount of land, equipment, costs and time. Nevertheless, contaminated water has been drained into rivers after adjusting its pH and after being filtered.

In dung processing, dung was attacked with bacteria for 5 to 7 days by the activated sludge process, then filtered through high polymer membranes, which cost 20 million Yen per cubic meter. In this way, however, COD could be lowered to only 90 to 95 mg/liter. Thereafter, the filtrate was mixed with ferric chloride to settle the contaminants and then passed through a layer of activated carbon to produce transparent water with COD of 30 mg/liter before being drained into the river. The cost of the purification equipment was 20 million Yen per ton, while the processing costs were 2,500 to 6,000 Yen per ton.

SUMMARY OF THE INVENTION

The object of this invention is, therefore, to provide an apparatus which can recycle water at a low cost by efficiently purifying various types of contaminated water.

The invention includes two types of apparatus to achieve this object, namely continuous and intermittent types.

In the continuous purification apparatus, contaminated water is continuously fed to a purification tank where it is purified. This apparatus comprises a mixer to mix contaminated water and purifying chemicals, a purification tank to receive the mixture from the mixer and in which tank inorganic and organic matter are separated into floating matter, sediment and purified liquid, a purified liquid piping system to take out the supernatant, and a drain piping system to take out the floating matter and sediment.

In the intermittent purification apparatus, contaminated water is fed intermittently into a purification tank in which the water is purified to some extent, and thereafter the purified water and contaminated water are intermittently exchanged. This apparatus comprises a mixer to mix contaminated water and purifying chemicals, a purification tank to receive the mixture from the mixer and in which tank inorganic and organic matter are separated into floating matter, sediment and purified liquid, a window mechanism provided at a certain location on the side wall of the purification tank to let the supernatant frequently flow from the purification tank, a tub installed at the lower periphery of said purification tank to receive the supernatant, a purified liquid piping system to take out the supernatant from the tub, and a drain piping system to take out the floating matter and sediment.

In order to enhance mixing in the purification tank, a supersonic vibrator, a mixing screw and an injector can be installed on the bottom part of the purification tank. An injector can be also installed on the tip of the mixer. The injector should function to inject liquid at a high pressure and speed.

The window mechanism may include a rectangular window on the side wall of the purification tank, and a door to be moved up and down over the window. One or more window mechanisms can be provided.

Exhaust gas can also be purified by feeding it into said injector.

The purification apparatus may have a single purification tank, or more than one tank connected horizontally or vertically in series if necessary.

Depending on the source, the contaminated water may be at a high temperature (e.g. turbine cooling water in thermal power plants, drainage water from air-conditioners, etc.). The temperature of such contaminated water is high after it has been purified. Therefore, such high temperature purified water can be fed into a heat exchanger to utilize the exhaust heat.

By using the apparatus of this invention, a contaminated water purification method such as the one described below can be carried out.

This contaminated water purification method uses two kinds of flocculants mixed into contaminated water in the first process to cause inorganic/organic matter to float or settle in the tank. In the second process, at least three kinds of flocculants are mixed in the overflown water produced in the first process to cause the remaining inorganic/organic matter to float or settle in the tank.

At least either one of the first or second processes described above is repeated more than once. Thus, semi-pure, pure and super-pure water can be obtained.

The flocculant used in the first process is a chemical including calcium (e.g. lime, bleaching power, etc.) and one or more kinds of chemicals such as aluminum polychloride, ferric chloride, aluminum sulfate, alum, sodium silicate, hydrochloride acid, sodium hydroxide, detergent, polymer flocculants.

The primary composition of the flocculant used in the second process is a calcium-containing chemical to which alum is added and one or more flocculants mentioned above.

DETAILED DESCRIPTION OF THE PREFERRED EMBODIMENTS

A sewage purification device according to the invention will be explained hereafter with reference to the drawings.

This invention generally includes two types of apparatus, continuous and intermittent.

The continuous purification apparatus feeds contaminated water continuously into a purification tank 1 and purifies it continuously. This continuous type purification apparatus comprises a mixer 2 to mix contaminated water and purifying chemicals, a purification tank 1 to receive mixed matter from the mixer 2 and to separate inorganic and organic floating matter, sediment and purified liquid, a purified liquid piping system 3, and a drain piping system 4 through which floating material and sediment are discharged.

Figure 1:
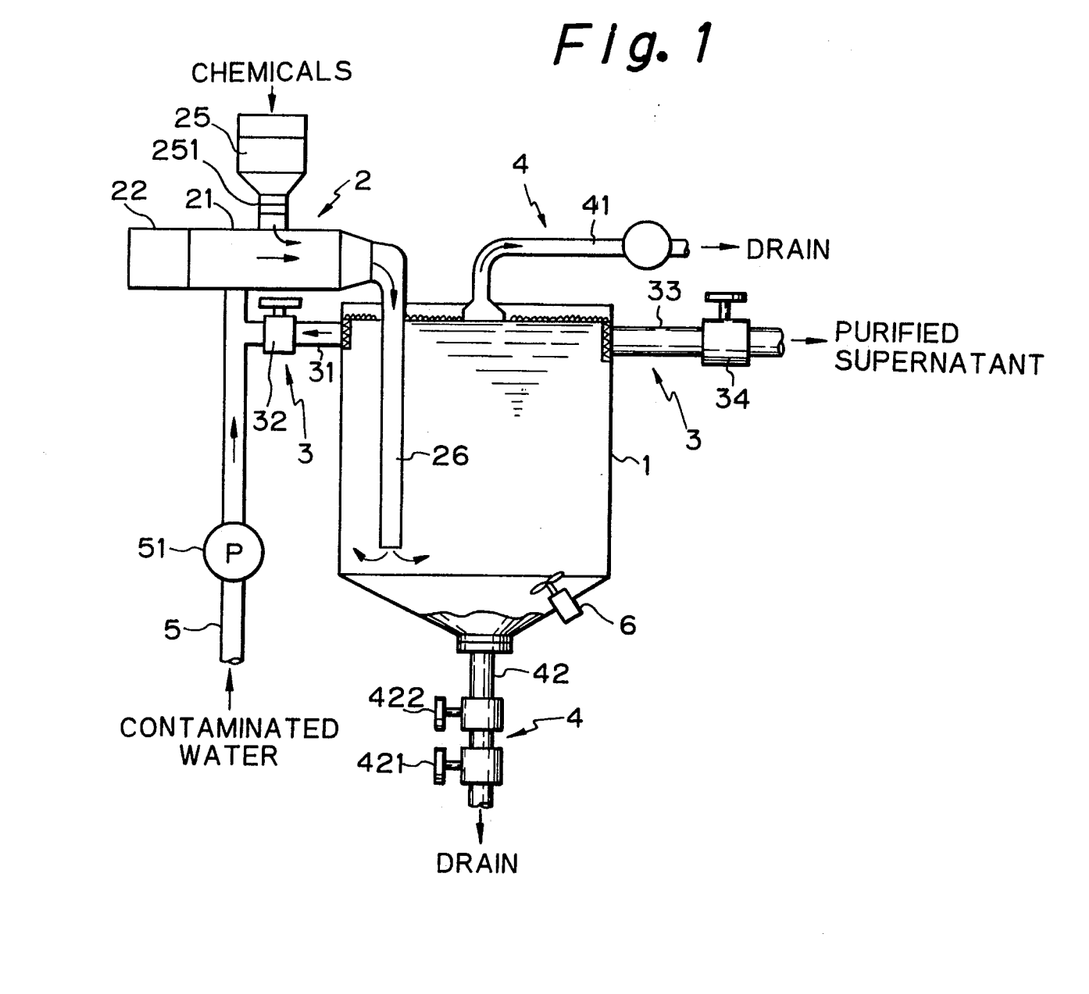
FIG. 1 is a schematic diagram of an embodiment of a continuous type contaminated water purification apparatus of this invention.
Figure 5:
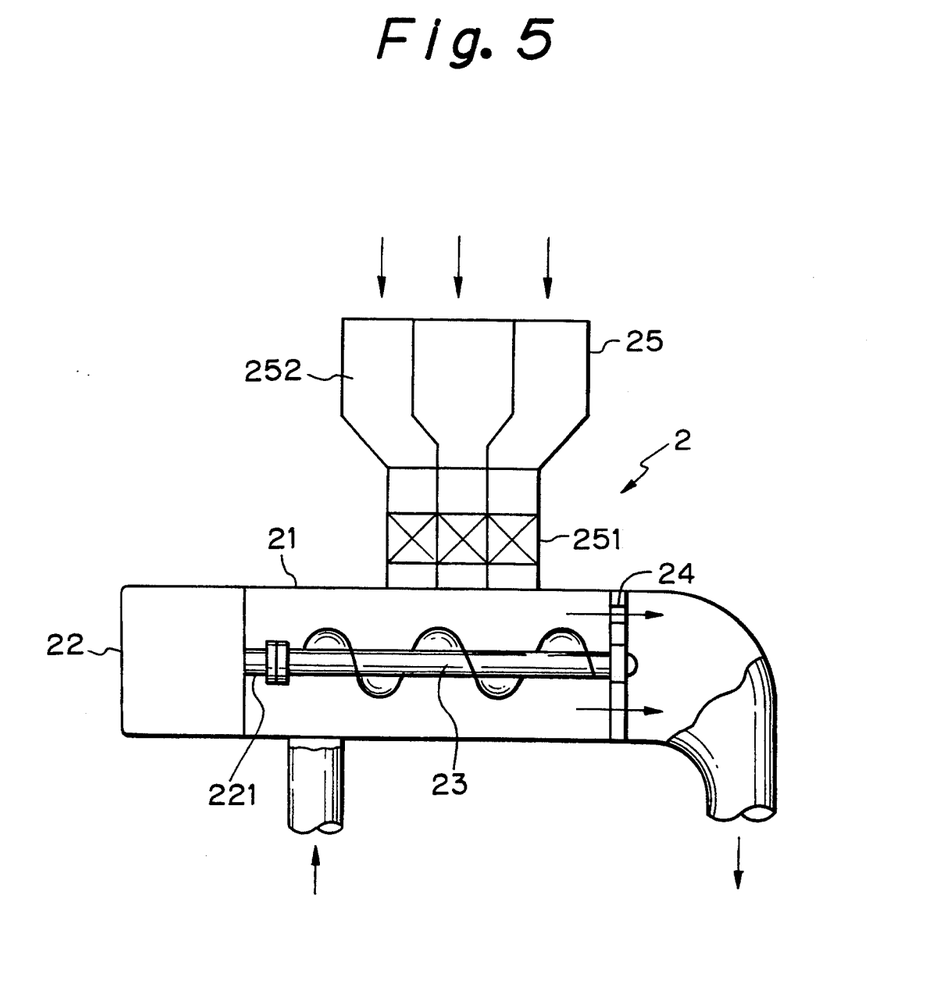
FIG. 5 is a longitudinal view, partly broken away, of the mixer used in the apparatus of this invention.

As shown in FIGS. 1 and 5, the motor 22 of the mixer 2 is fixed on the end of a body 21, and a screw shaft 23 is mounted on the motor drive shaft 221. The end of the screw shaft 23 is supported by the body 21 so that it rotates freely. A flow meter 24 is mounted near the end of the screw shaft.

A hopper having a plurality of partitions is mounted at the center of the body 21, and partitioned compartments 252 are connected to the inside of the body 21 through respective valves 251. To each of the partitioned compartment 252, necessary purifying chemicals are supplied.

A contaminated water induction pipe 5 is connected to the bottom of the body 21 via a pump 51. The connecting pipe 31 of the purified liquid pipe system 3 is connected to the contaminated water induction pipe 5 via a valve 32. An overflow pipe 33 of the purified liquid pipe system 3 is mounted on the upper part of the purification tank 1 via a valve 34.

The drain pipe system 4 is composed of an upper pipe 41 into which floating matter is suctioned, and a lower pipe 42 through which sediment is removed. The lower pipe 42 is equipped with valves 421 and 422.

At the exit of the mixer 2, a conducting pipe 26 extends to the lower part of the purification tank 1 to conduct a mixture of contaminated water and chemicals to the inside the tank 1. As the motor 22 operates, the screw shaft 23 rotates and mixes contaminated water with chemicals and sends the mixture to the conducting pipe 26.

Figure 2:
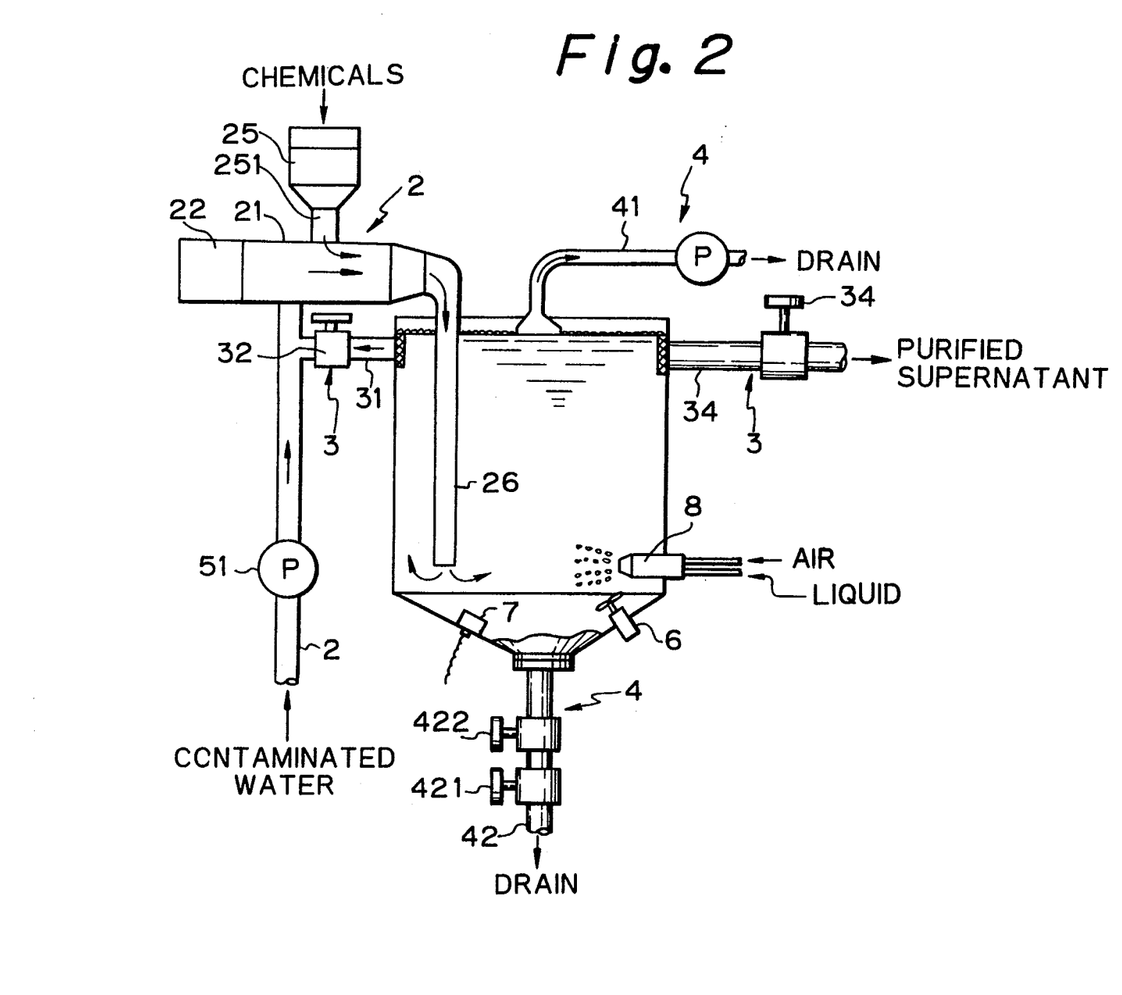
FIG. 2 is a schematic diagram of another embodiment of the continuous type contaminated water purification apparatus.
Figure 6:
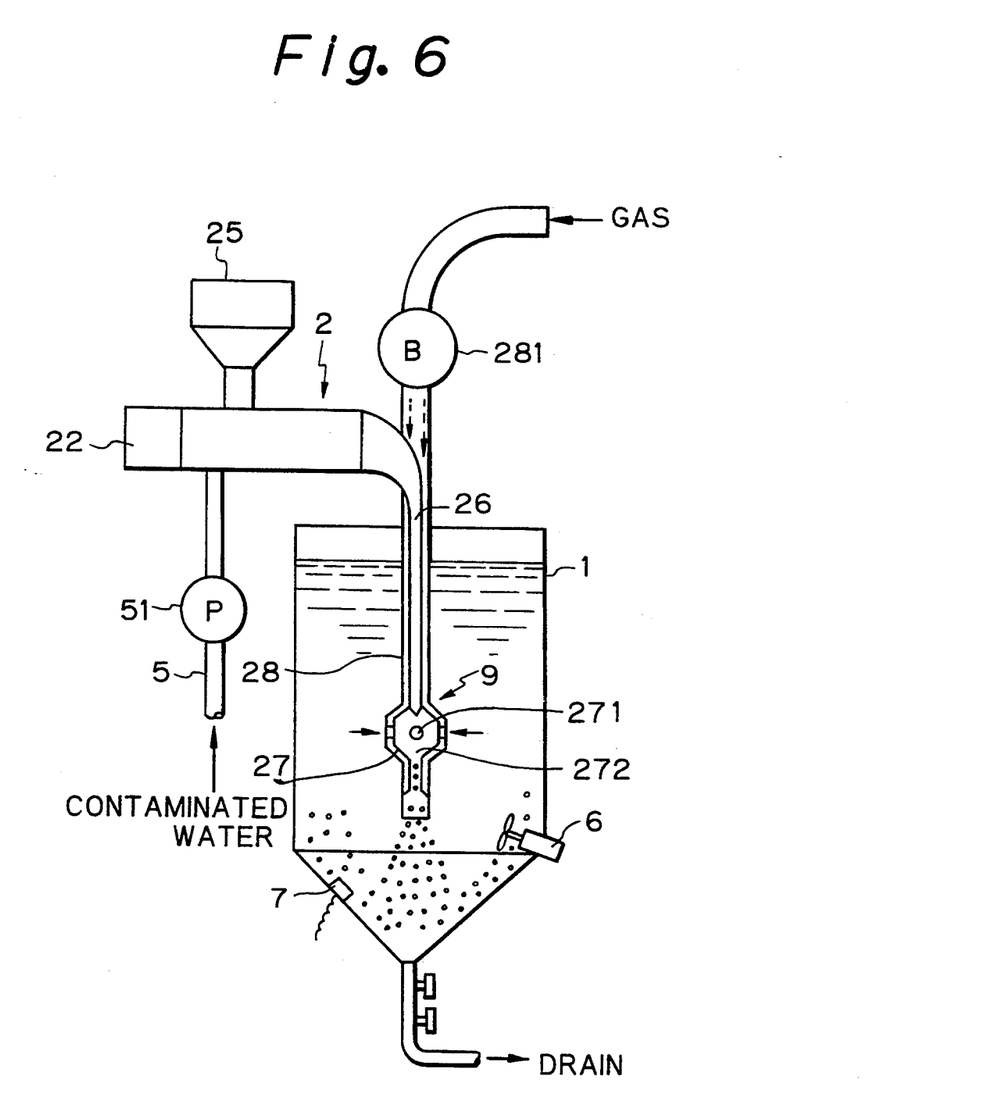
FIG. 6 is a schematic diagram of the injector installed on the mixer shown in FIG. 5.

In order to promote the mixing within the purification tank 1, a supersonic vibrator 7 as shown in FIG. 2 and an injector 8 are mounted on the bottom of the purification tank in addition to the mixing screw 6, or an injector 9 (as shown in FIG. 6) can be installed at the end of the mixer 2. Injectors 8 and 9 function to inject gas and liquid at a high pressure and speed, which will be explained later in detail.

The purification tank 1 may have a large diameter.

Figure 3:
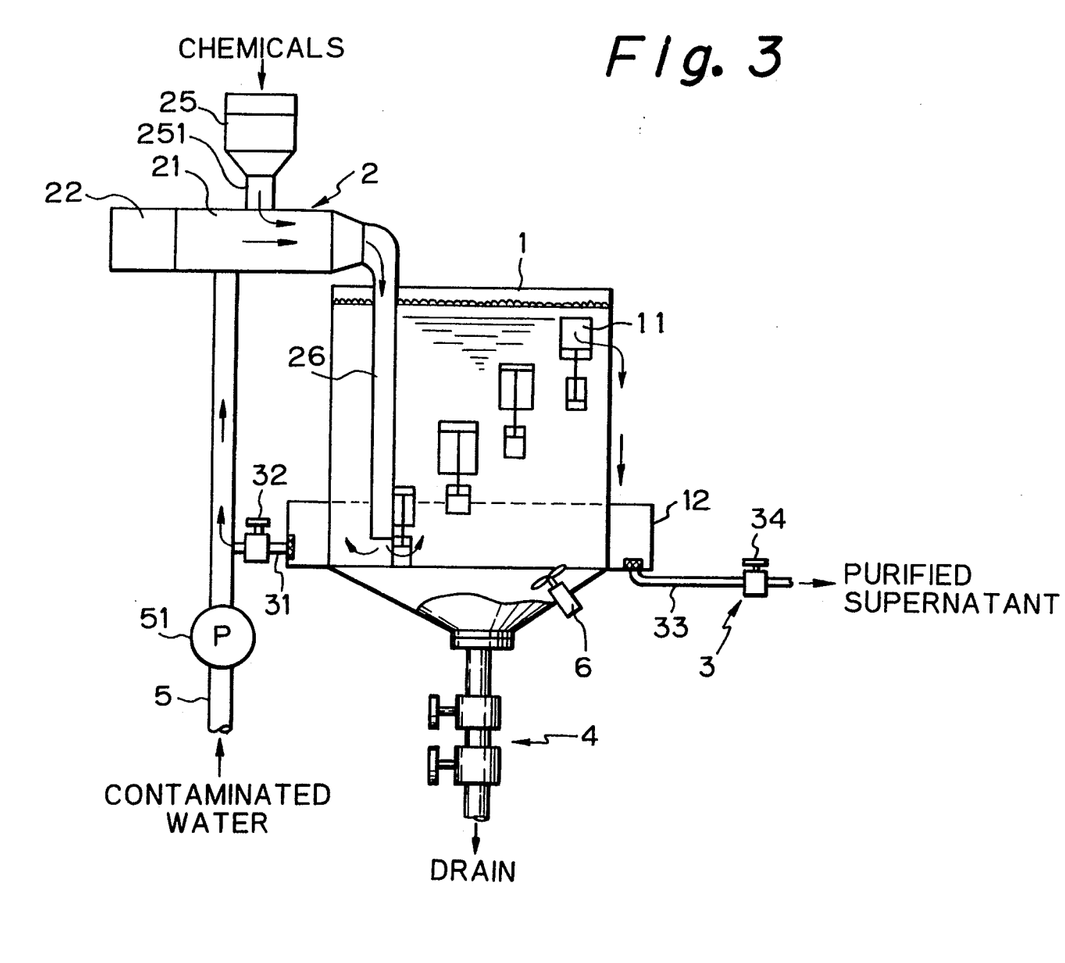
FIG. 3 is a schematic diagram of an embodiment of an intermittent contaminated water purification apparatus of this invention.

As shown in FIG. 3, in an intermittent type purification apparatus, contaminated water is fed intermittently into the purification tank 1 and is purified to some degree. Then, the purified water is intermittently exchanged with contaminated water. This intermittent type purification apparatus comprises a mixer 2 to mix contaminated water and purifying chemicals, a purification tank 1 to receive mixed liquid from the mixer and separate organic and inorganic matter into floating matter, sediment and purified liquid, window mechanisms 11 installed at certain locations on the side wall of the purification tank to let the supernatant liquid of the purified liquid overflow the purification tank, a tub 12 at the lower periphery of said purification tank 1 to receive the overflowing supernatant liquid, a purified liquid piping system 3 to discharge the supernatant liquid from the tub 12, and a drain piping system 4 to discharge floating matter and deposits.

Figure 4:
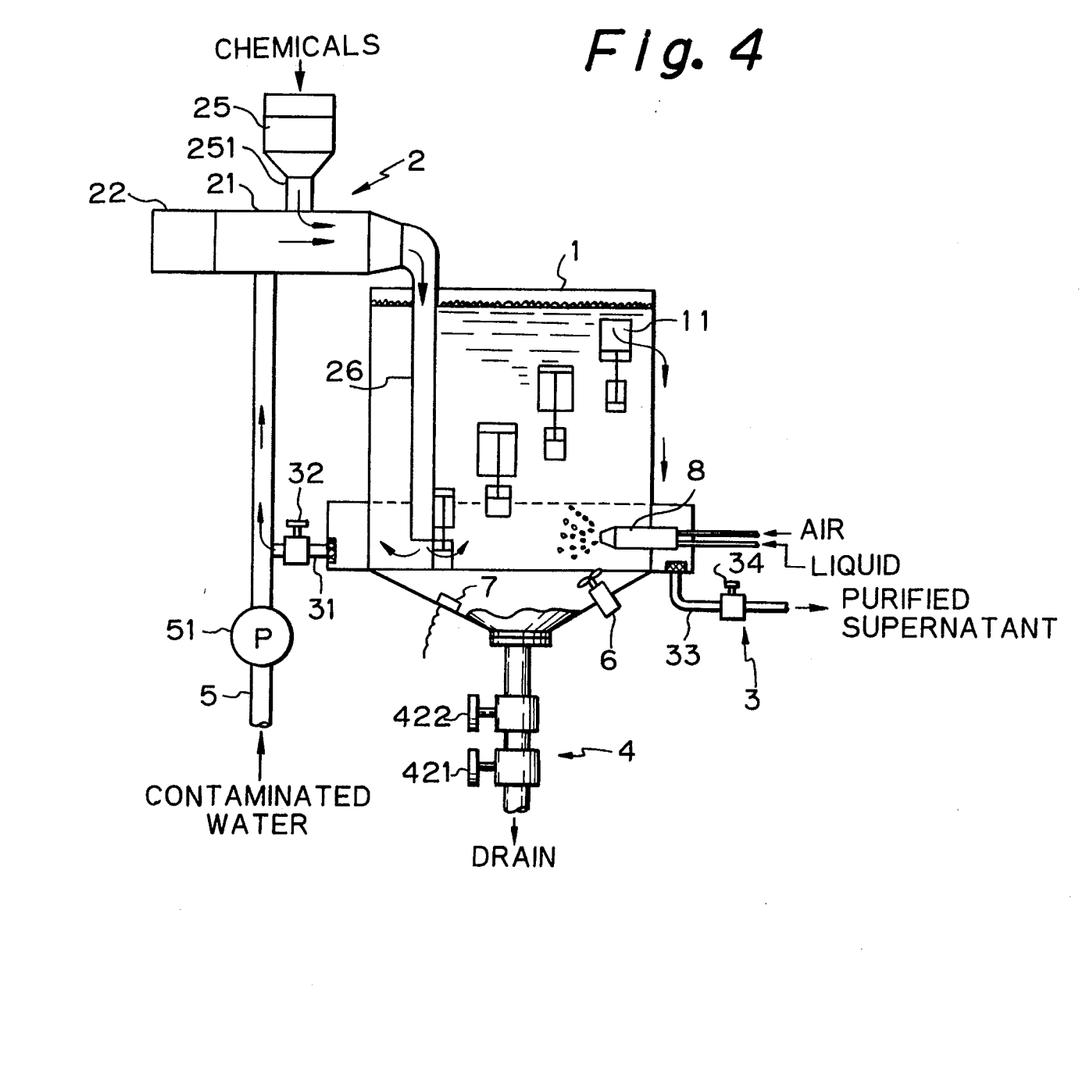
FIG. 4 is a schematic diagram of another embodiment of the intermittent type contaminated water purification apparatus.

As shown in FIG. 4, in order to promote the stirring of the mixture in the purification tank 1, a supersonic vibrator 7, and an injector 8 can be installed on the bottom of the purification tank in addition to the mixing screw 6. An injector may be also installed on the tip or the mixer (FIG. 6). The injectors 8 and 9 function to inject liquid at a high pressure and temperature, details of which will be described later.

Figure 14:
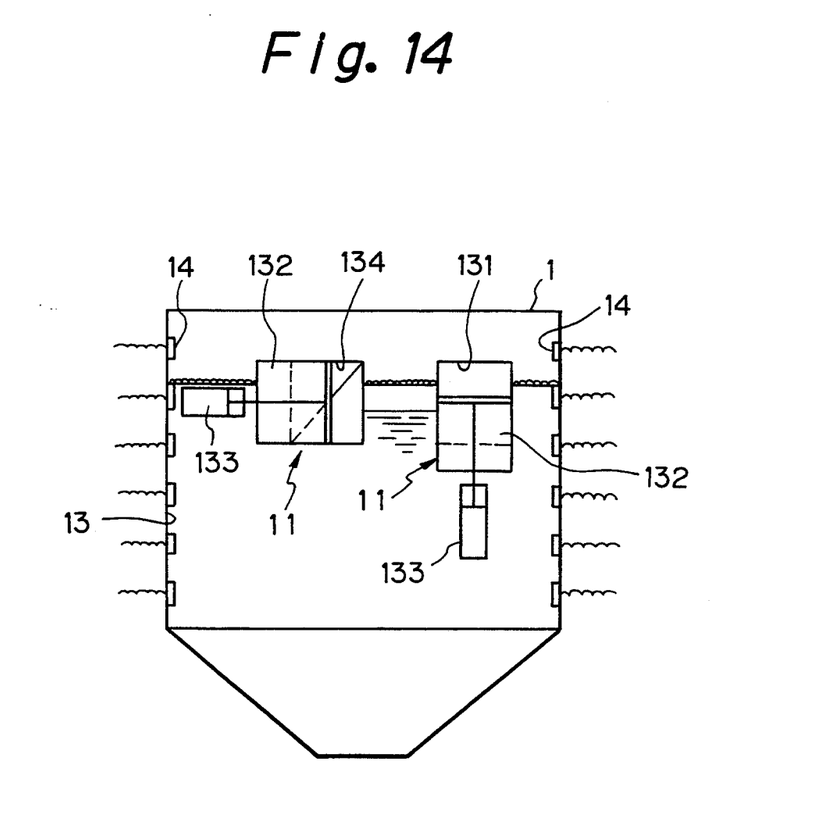
FIG. 14 is a schematic diagram of an embodiment of a window mechanism used in the apparatus of this invention.

As shown in FIG. 14, each window mechanism 11 includes rectangular windows 131 in the side wall 13 of the purification tank 1. A rectangular door 132 is provided in the window 131 to be moved up and down by a cylinder 133. Alternatively, a triangular window 134 is provided in the side wall 13 of the purification tank 1, and a door 132 is moved horizontally by a cylinder 133. In the latter case, the door 132 and the window 134 may be triangular and rectangular, respectively.

The door 132 may be opened or closed by activating the cylinder 133 based on a single issued by a detector 14 which detects the degree of the purification of the mixture in the tank (e.g. the degree of transparency). The detector 14 can be of a conventional optical, electrical, magnetic or mechanical type.

One or more window mechanisms 11 can be provided.

Next, the structure and operation of the injector 9 mounted on the tip of the mixer 2 will be described by referring to FIGS. 6 and 7.

A mixing nozzle 27 is mounted at the tip of the induction pipe 26 installed on the outlet of the mixer 2. A covering pipe 28 is provided at the periphery of the induction pipe 26 with a gap left between them. The mixing nozzle 27 has a plurality of holes 271 open to the purification tank 1. The liquid to be purified can flow out from the holes 271.

Near the open end of the nozzle 27 there are a number of small holes 272. The lower end of the covering pipe 28 is connected to the nozzle 27 and is closed. the upper end of the covering pipe 28 is equipped with a blower 281 to suck outside gas (air) or exhaust gas, etc. into the tank.

The induced gas passes through the covering pipe 28 and enters the nozzle from the small holes 271 of the nozzle 27, wherein it mixes with the liquid to be purified drawn in through the holes 271. The gas becomes a gas-liquid mixture consisting of fine bubbles and fine particles and is injected into the purification tank 1.

Figure 7A:
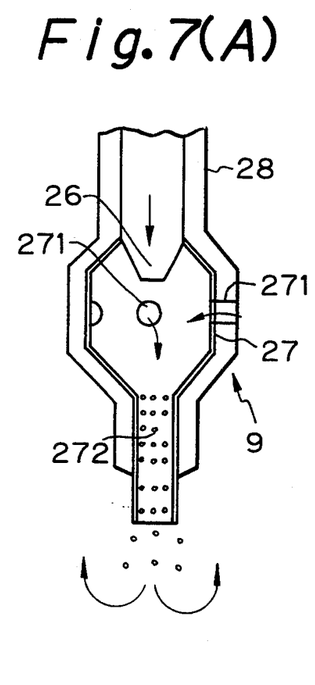
FIGS. 7(A), 7(B) and 7(C) are schematic diagrams of alternative embodiments of the injector shown in FIG. 6.
Figure 7B:
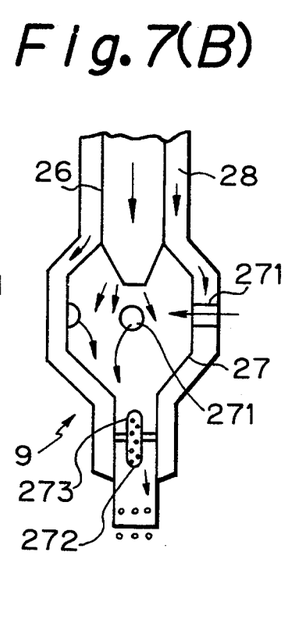
Figure 7C:
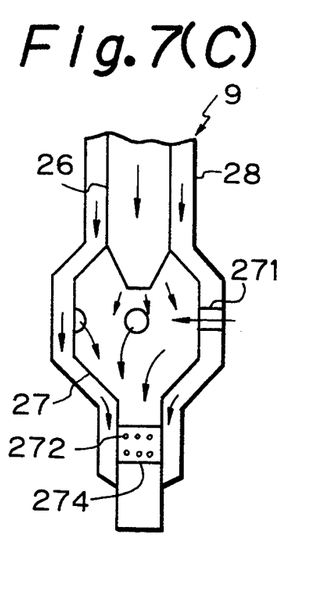

As shown in FIG. 7, the small holes 272 in the nozzle tip may be located along the periphery of the nozzle 27 (FIG. 7A). Alternatively, a streamlined, long, multiple-hole injector 273 may be provided inside the end of the nozzle 27 (FIG. 7B), or a wing-shaped cross injector 274 may be provided within the end of the nozzle 27 (FIG. 7C).

Figure 18:
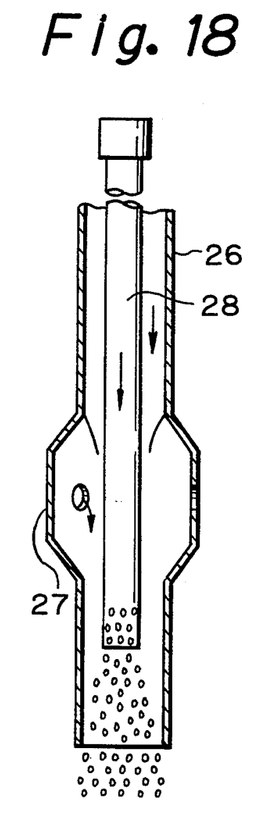
FIG. 18 is a longitudinal sectional view of the injector shown in FIG. 6, with some alterations.

In the injector 9, the induction pipe 26 may be arranged inside the covering pipe 28 as shown in FIG. 18. Other variations of the nozzle 27 are shown in FIGS. 19(A)–19(D).

The pressure and speed of the gas-liquid mixture can be controlled by changing the number of revolutions of the blower 281.

The injector 8 installed on the lower part of the purification tank 1 will be described by referring to FIGS. 8 through 13.

Figure 8:
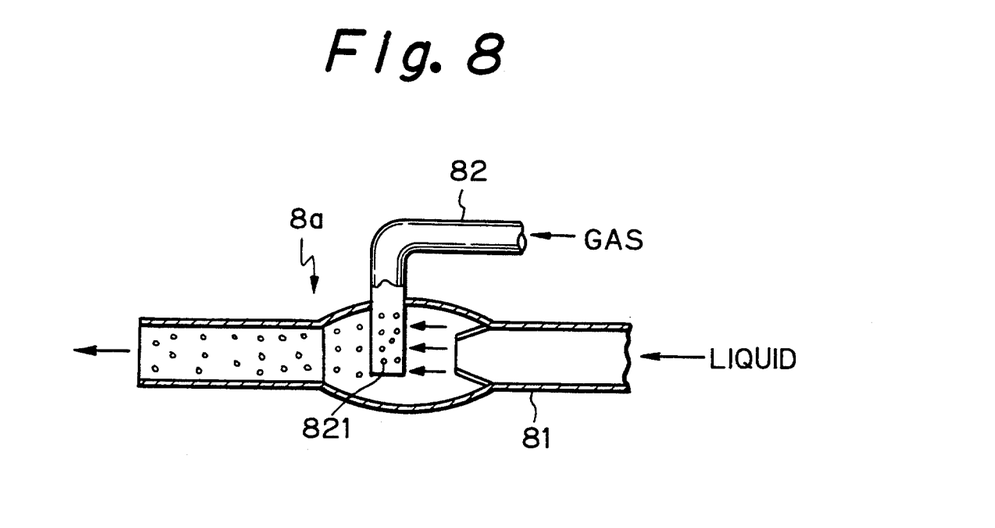
FIG. 8 is a longitudinal view, partly in section, of an injector used in the apparatus of this invention.

The injector 8a shown in FIG. 8 comprises a liquid transport pipe 81 into which a gas transport pipe 82 extends. The end of the gas transport pipe 82 is closed and there are a number of small holes 821 near its tip.

At this point, the liquid comprises contaminated water, purified liquid, chemicals and the like; whereas the gas comprises air, exhaust gas and the like.

The gas and liquid are mixed within the injector 8a, and the above-mentioned gas-liquid mixture is injected into the tank.

Figure 9:
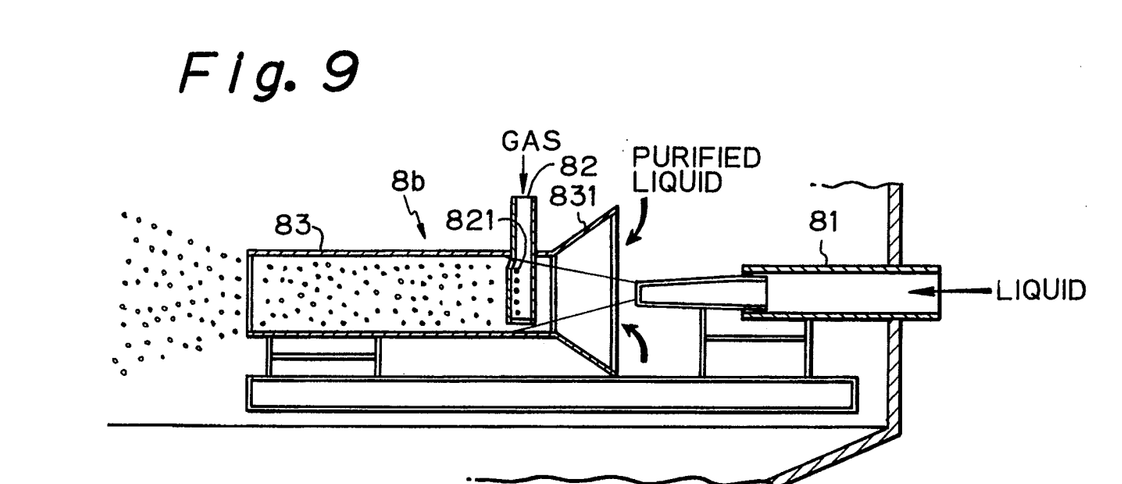
FIG. 9 is a similar view of another injector.
Figure 10:
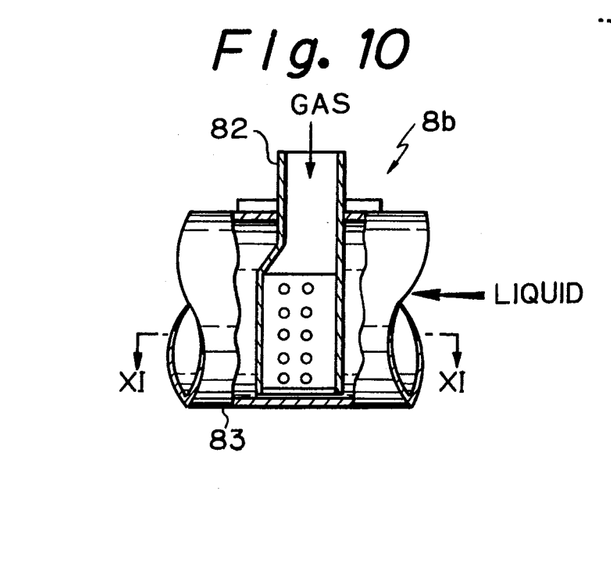
FIG. 10 is an enlarged view of part of the injector shown in FIG. 9.
Figure 11:
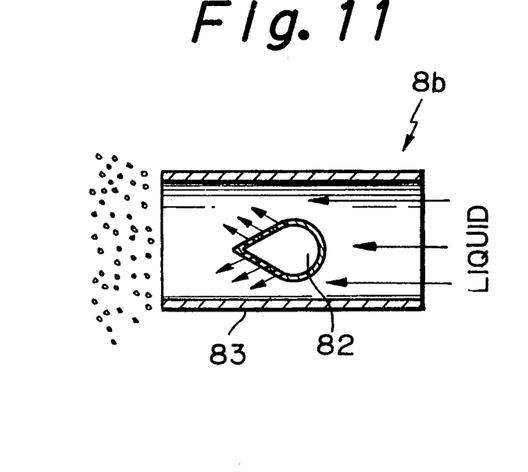
FIG. 11 is a cross-sectional view taken along line XI—XI.

The injector 8b shown in FIGS. 9, 10 and 11 is spaced from and faces the entrance 831 of the mixing pipe 83. The tip of the gas transport pipe 82 extends into the mixing pipe 83 downstream of the entrance 831 of the mixing pipe 83. Liquid from the pipe 81 as well as surrounding liquid to be purified are sucked into the entrance 831.

In this injector 8b, when liquid to be purified in the purification tank 1 of about twice the volume of liquid injected from the liquid transport pipe 82 is sucked into the mixing pipe 83 and is injected under high pressure, liquid is sucked through the small holes 821 of the pipe 82, which creates a myriad of ultra-fine bubbles, and is injected into the purification tank 1 from injector 8b. At this time, the bubble stream agitates the water to be purified in the purification tank 1, and dissolved matter is absorbed by the liquid whereas the exhaust gas is purified.

As shown in FIGS. 10 and 11, the end of the gas transport pipe 82 is streamlined so as not to offer resistance to the liquid flow.

Figure 12A:
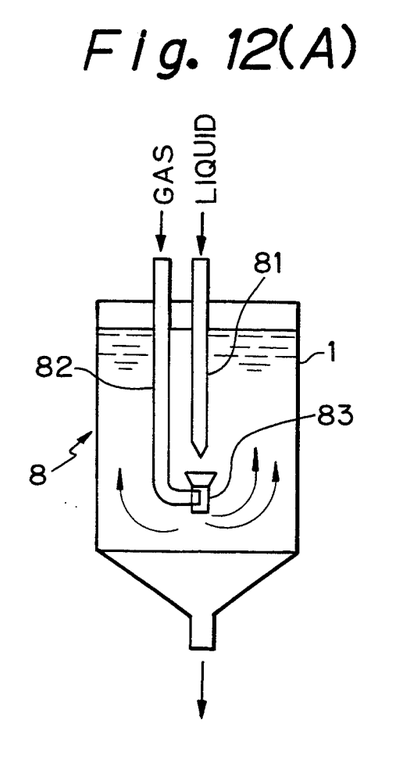
FIGS. 12(A) and 12(B) are schematic diagrams of embodiments of the injector.
Figure 12B:
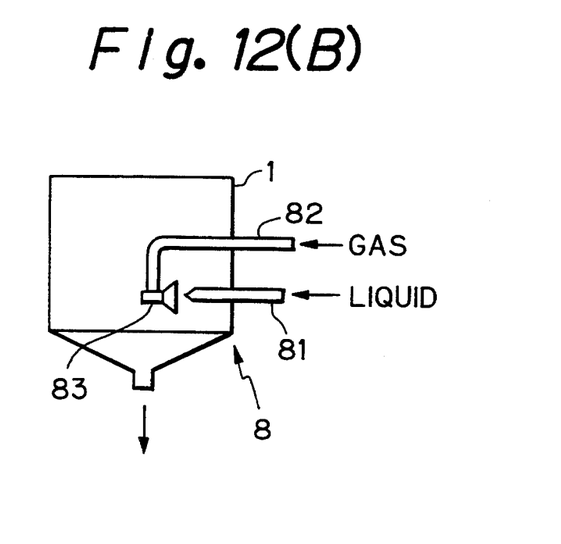

The injector 8 can be arranged in either the vertical (Fig. 12 (A)) or horizontal (FIG. 12 (B)) direction.

Figure 13A:
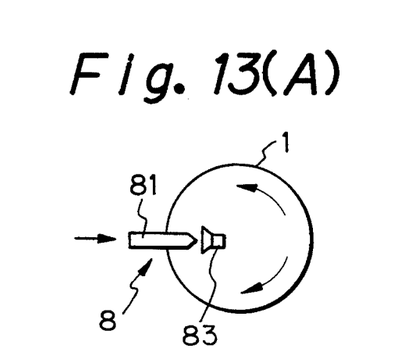
FIGS. 13(A) and 13(B) are each top views of a respective version of the injector shown in FIG. 12(B).
Figure 13B:
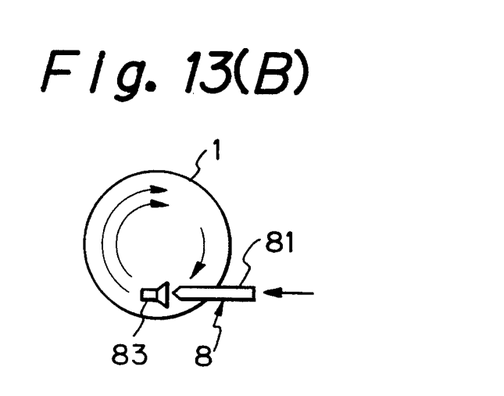

With respect to the arrangement shown in FIG. 12 (B), the gas-liquid mixture flow may be directed either along the side wall 13 of the purification tank 1 after colliding with it as shown in FIG. 13 (A) or without a collision as shown in Fig. 13 (B).

Figure 15:
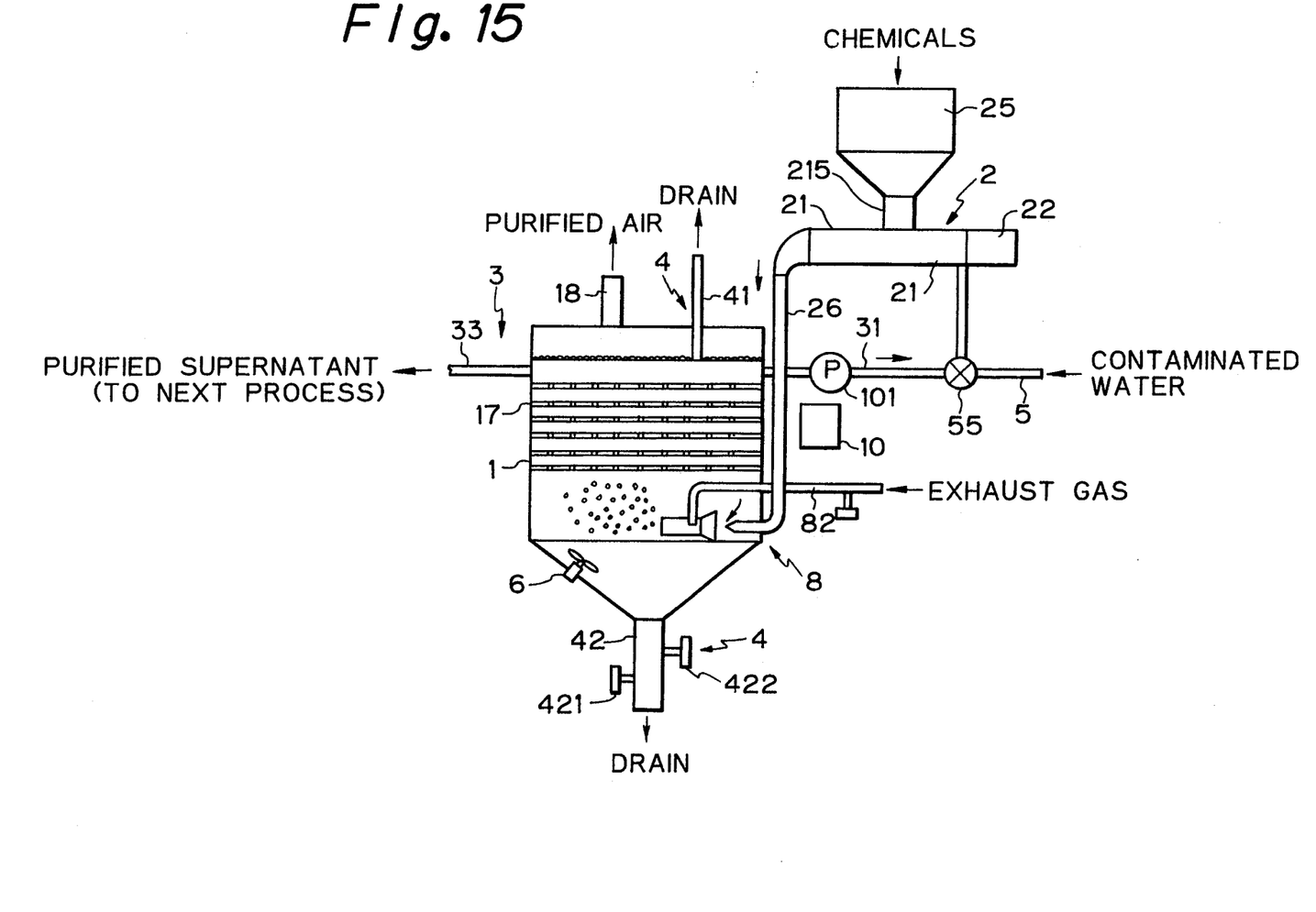
FIG. 15 is a schematic diagram of another embodiment of the apparatus of this invention.

FIG. 15 shows an embodiment of an apparatus that purifies one of contaminated water and exhaust gas, or both of the same.

The hopper 25 is divided into an adequate number of compartments into which a single or mixed coagulants consisting of various chemicals are provided. A switch on a control panel 10 is turned on to start a pump 101 which sends contaminated water from the purification tank 1 to the mixer 2 via the connecting pipe 31 under some pressure.

Liquid to be purified is sent forward by the rotating screw 23 connected to the motor 22, and the volume of the liquid going through the mixer 2 is calculated by the flow meter 24 installed in the mixer 2. A certain amount of each coagulant necessary for a ton of liquid to be purified is fed into the mixer 2 via the supply pipe 215 according to an instruction from the control panel 10.

When the liquid to be purified and the coagulant are mixed, the mixture flows down under pressure through the induction pipe 26 and is injected into the purification tank 1 under a high pressure by the injector 8 installed within the tank.

On the other hand, the exhaust gas is sucked at a high speed from the pipe 82 and mixed with liquid to be purified to create a number of bubbles mixed with ultra fine particles which is injected from the injector 8 and into the purification tank 1, wherein it contacts and is mixed with the liquid to be purified.

CO 1–3, SO 1–3 and NO 1–5 included in the bubbles are absorbed and dissolved in the liquid to be purified successively. SO 1–3 dissolves and changes to dilute sulfuric acid, and NO 1–5 dissolves and changes to dilute nitric acid.

These acids are progressively neutralized in the mixture of various purifying chemicals, dissolved, and purified. Simultaneously, traveling up through the liquid to be purified, the gas collides with a suitable number of punched metal fixtures 17 installed in the purification tank 1 and collides with other matter, whereby it is dispersed and dissolves to repeatedly purify the liquid. Finally, the gas is released into the atmosphere without any contaminants via the exhaust pipe 18.

The drainage that neutralized various acid deposits on the bottom of the purification tank 1 is discharged by opening the valves 421 and 422.

When both exhaust gas and contaminated water or the latter alone is to be purified, the contaminated water is fed from the pipe 5 via the valve 55 into the mixer 2 in which the purification process takes place. Thereafter the supernatant liquid is subjected to the next purification process by being discharged through the pipe 33. Floating matter generated during the purification process is removed by suction in the pipe 41 while deposits are removed from the bottom of the purification tank 1.

Figure 16A:
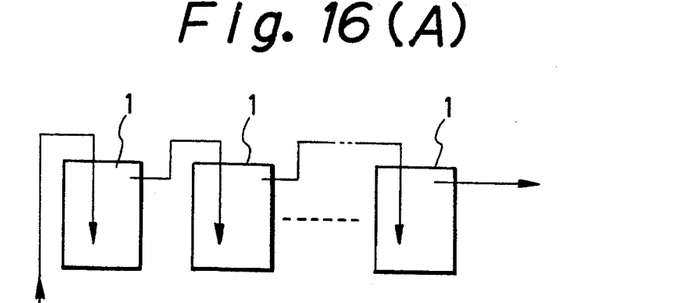
FIGS. 16(A) and 16(B) are each a block diagram of a system using the apparatus of this invention.
Figure 16B:
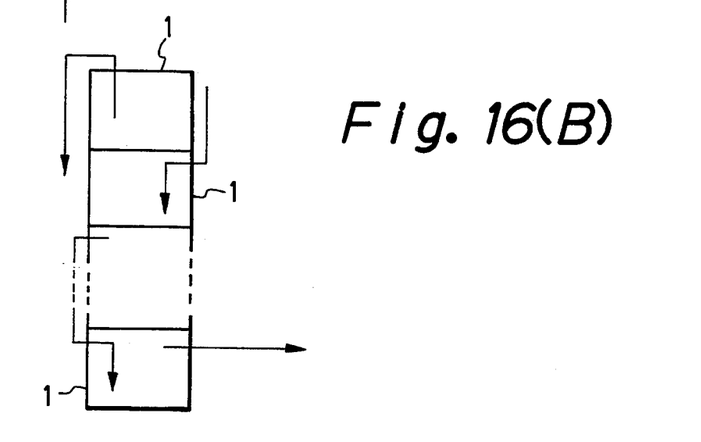

The purification apparatus may use a single purification tank or it may use more than one purification tank 1 connected in series horizontally as shown in FIG. 16(A) or vertically as shown in FIG. 16(B).

Figure 17A:
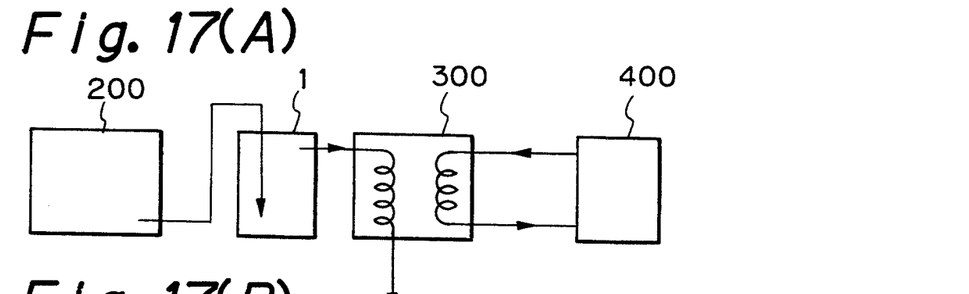
FIGS. 17(A) and 17(B) are each a block diagram of facilities to which the apparatus of this invention can be applied.
Figure 17B:
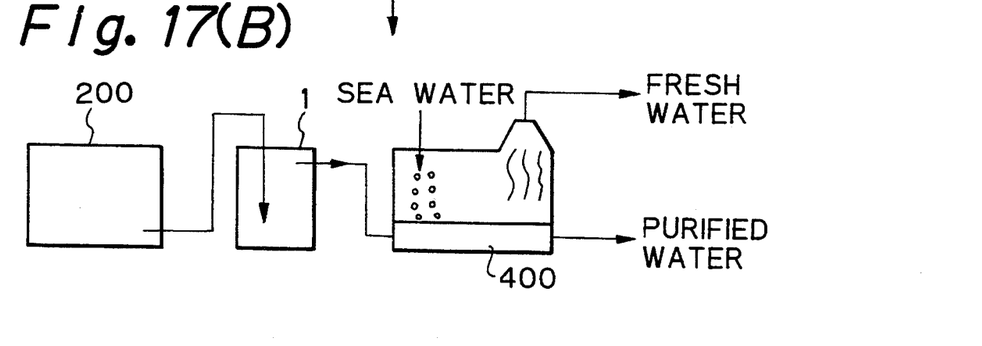
Figures 19A, 19B:
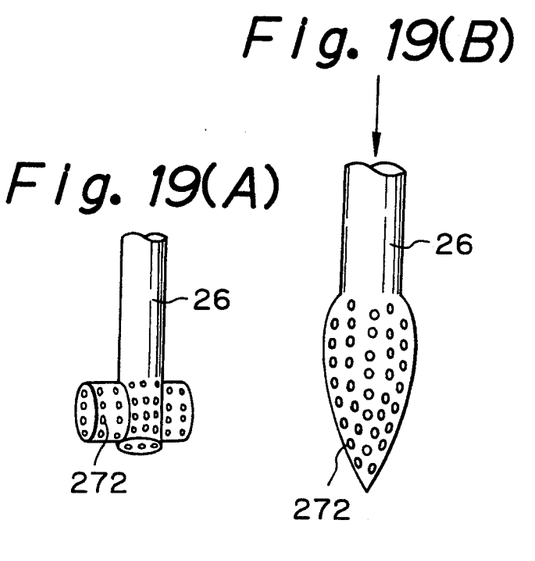
FIGS. 19(A), 19(B), 19(C) and 19(D) are perspective views of various embodiments of the gas jet nozzle of the injector.
Figures 19C, 19D:
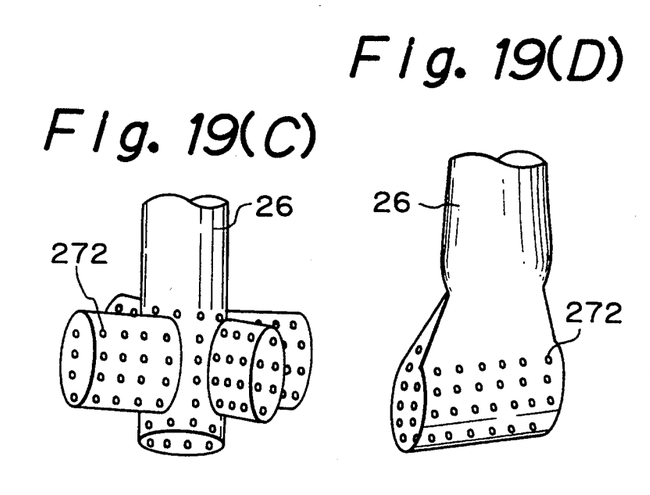

As shown in FIGS. 17(A) and 17(B), depending on the source, contaminated water 200 (e.g. turbine cooling water in thermoelectric power plants, drainage water from air-conditioners, etc.) may be at a high temperature. The temperature of such contaminated water is considerably high even after it has been purified in the purification tank 1. Therefore, the exhaust heat of such high temperature purified water can be sent to a heat exchanger 300, etc. to utilize its heat for some facility 400. Such a facility may be a heated swimming pool as shown in FIG. 19(A) or a desalination plant as shown in FIG. 17(B).

This invention can be applied to purify not only contaminated water and exhaust gas, but also water from swimming pools, baths, hot springs and various types of entertainment facilities, or air from factories, theaters, meeting places, exhibitions and the like.

In addition to these, some of the other applications of the invention are as follows:

(1) a purification method and apparatus that produces harmless water and air by purifying at a low cost water contaminated on and in space, or a large amount of water used and disposed of for the purpose of preventing environmental contamination, (2) purification of domestic waste water, miscellaneous sewage, industrial waste liquid, factory waste liquid, and cooling water from nuclear power plants, thermoelectric power plants, boilers, air-conditioners and so on, (3) purification of various kinds of waste liquid, garbage liquid waste, incinerator liquid waste, dyes, detergent, kitchen water, slaughterhouse waste, meat and fish processing waste, (4) purification of algae bloom, red tides, seaweed and muddy water, (5) sterilization of domestic and other animal wastes, bacteria, colon bacilli, cholera germs, and Salmonellae, (6) production of phosphorus, nitrogen, carbon dioxide, cyanogen, drugs, heavy metals, agricultural chemicals and sterilizing chemicals, (7) purification of rivers, lakes and swamps, ponds, seas and sludge, (8) purification of drinking water, semi-drinkable water and sewage, (9) purification of highly-contaminated water at construction sites (dams, tunnels, rivers, reclamation, buildings, bridges, dredging sites, marine development sites, tunnel construction sites, and deep underground structures), (10) prevention of environmental contamination and securing of emergency drinking water in the event of droughts or disasters, (11) production and re-utilization of super pure water than can be used after the process of purification by the last membrane only to clean IC and electronics parts, (12) purification, desalination and conversion of cooling and heating water for nuclear power plants, thermoelectric power plants, boilers, combustion engines and heat engines, hot water, or seawater pumped up in a large amount or for cooling, into drinking water, semi-drinkable water or industrial water, (13) afforestation of deserts by purifying and desalinating seawater which is sent to large lakes made in the desert and a canal connected it.

I claim:

1. A purification apparatus comprising:

a purifying tank; a mixer including a casing, a screw rotatably supported and extending in said casing, and a conducting pipe communicating with and extending downwardly from an end of said casing into said purification tank;

a flow meter mounted to the end of the casing of said mixer from which said conducting pipe extends;

a hopper having a plurality of partitions dividing the interior thereof into a plurality of separated compartments, each of said compartments communicating with the interior of the casing of said mixer;

a contaminated substance induction pipe connected to and opening into the casing of said mixer;

a purified substance piping system including piping open to said purifying tank at an upper portion thereof;

and a drainage piping system including piping open to said purifying tank at both an upper portion and a bottom portion thereof.

2. A purification apparatus as claimed in claim 1, and further comprising injection means, within said tank at the bottom thereof, for mixing a gas and a liquid and injecting the mixed gas and liquid into the tank.

3. A purification apparatus as claimed in claim 2, wherein said injection means is attached to said mixer at a downstream end thereof with respect to a direction in which materials mixed by the mixer are introduced by the mixer into said purifying tank.

4. A purification apparatus comprising:
a purifying tank including a peripheral side wall;
a mixer including a casing, a screw rotatably supported and extending in said casing, and a conducting pipe communicating with and extending downwardly from an end of said casing into said purification tank;
a flow meter mounted to the end of the casing of said mixer from which said conducting pipe extends;
a hopper having a plurality of partitions dividing the interior thereof into a plurality of separated compartments, each of said compartments communicating with the interior of the casing of said mixer;
a contaminated substance induction pipe connected to and opening into the casing of said mixer; at least one window means, provided on the peripheral side wall of said purifying tank, for selectively allowing supernatant of material filling the tank to at least one level to flow from the tank at said level;
a tub extending around the periphery of said tank at the bottom thereof;
a purified substance piping system including piping open to said tub;
and a drainage piping system including piping open to said purifying tank at an upper portion thereof.

5. A purification apparatus as claimed in claim 4, and further comprising injection means, within said tank at the bottom thereof, for mixing a gas and a liquid and injecting the mixed gas and liquid into the tank.

6. A purification apparatus as claimed in claim 5, wherein said injection means is attached to said mixer at a downstream end thereof with respect to a direction in which materials mixed by the mixer are introduced by the mixer into said purifying tank.

7. A purification apparatus as claimed in claim 4, wherein each of said window means includes a rectangular window extending in the peripheral side wall of said tank, and a vertically movable rectangular door disposed over said window.

8. A purification apparatus as claimed in claim 4, wherein each of said window means includes a triangular window extending in the peripheral side wall of said tank, and a horizontally movable rectangular door disposed over said window.

* * * * *